UNITED STATES PATENT OFFICE.

HIROSHI NOMURA, OF SENDAI, JAPAN.

METHOD OF PREPARING "ZINGIBERONE." (METHYL 3-METHOXY-4-HYDROXYPHENYL-ETHYL KETONE.)

1,263,796.

Specification of Letters Patent. Patented Apr. 23, 1918.

No Drawing.

Application filed June 6, 1917. Serial No. 173,114.

*To all whom it may concern:*

Be it known that I, HIROSHI NOMURA, professor of chemistry, a subject of the Emperor of Japan, residing at No. 30 Kadan, city of Sendai, Miyagi Prefecture, Empire of Japan, have invented a certain new Method of Preparing "Zingiberone," (Methyl 3-Methoxy-4-Hydroxyphenylethyl Ketone,) a pungent principle of ginger-root; (*Zingiber officinale,*) of which the following is a specification.

I have found that zingiberone is easily prepared by the reduction of vanillalacetone which is obtained by the condensation of vanillin and acetone in presence of caustic alkali, the process being illustrated in the following scheme:

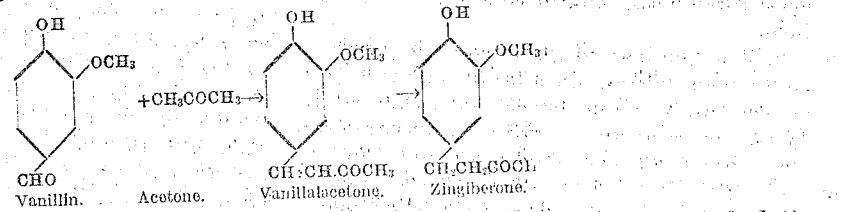

The procedure is for instance as follows:

1. *Vanillalacetone.—*

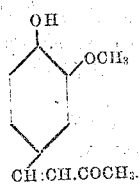

70 c. c. of 10% caustic soda solution were added to the solution of 25 grams of vanillin in 100 c. c. of acetone, and after being allowed to stand for four days, the solution was acidified with dilute hydrochloric acid, when a yellow precipitate was obtained. The precipitate was filtered, washed with water until free from chlorid and recrystallized from dilute alcohol, from which it separated in yellow crystals and melted at 128–129°. The yield was 28 grams after once crystallizing.

2. *Methyl 3-methoxy-4-hydroxyphenyl-ethyl ketone, (zingiberone).—*

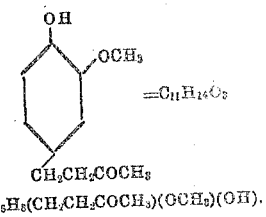

$C_6H_3(CH_2CH_2COCH_3)(OCH_3)(OH)$.

6 grams of vanillalacetone were suspended in 100 c. c. of absolute ether and reduced by means of hydrogen in the presence of platinum black. The hydrogen absorbed was about 800 c. c. (at 23–24° and 752–754 mm.) for nine hours. After filtering off the platinum black, the filtrate and ethereal washings of the platinum black were evaporated and the residual oil on distillation boiled constantly at 187–188° under 14 mm. The yield was 4.8 grams. The oil was twice recrystallized from a mixture of ether and petroleum ether (B. P. below 60°). The crystals thus obtained melted at 40–41° and were analyzed with the following results:

0.1629 gave 0.4058 $CO_2$ and 0.1090 $H_2O$. C=67.94; H=7.49.

0.1244 gave 0.3113 $CO_2$ and 0.0850 $H_2O$. C=68.25; H=7.64.

$C_{11}H_{14}O_3$ requires C=68.00; H=7.27 per cent.

The substance produced no lowering of the melting point by mixing with the natural zingiberone. The benzoyl derivative and the oxim of methyl ether of the substance melted respectively at 126–127° and 93–93.5°, and also produced no depression of the melting point by mixing with the corresponding derivatives of zingiberone. From these facts, its identity with zingiberone is beyond doubt.

Having now described my invention, what I claim is:

1. A new method of preparing "zingiberone" (methyl 3-methoxy-4-hydroxyphenyl ethyl ketone) a pungent principle of ginger root (*Zingiber officinale*) having the constitutional formula,

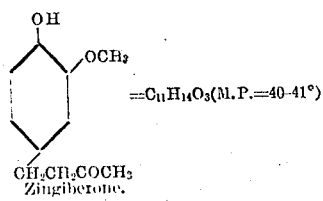
Zingiberone.

comprising adding an alkaline solution to a solution of vanillin and acetone, then acidifying the solution to obtain a precipitate, then dissolving the precipitate in a solvent and crystallizing the vanillalacetone out of the solution, then dissolving the vanillalacetone crystals in a solvent and reducing the solution by means of hydrogen in the presence of platinum black, filtering off the platinum black, then evaporating the filtrate to an oil, then distilling the oil, then dissolving the distillate in a solvent and finally crystallizing the zingiberone out of the solution.

2. The method of preparing zingiberone comprising adding an alkaline solution to a solution of vanillin and acetone, then acidifying the solution to obtain a precipitate, then dissolving the precipitate in a solvent and crystallizing the vanillalacetone out of the solution, then dissolving the vanillalacetone crystals in ether, then reducing the solution by means of hydrogen in the presence of platinum black, then filtering off the platinum black, then evaporating the filtrate to an oil, then distilling the oil, then dissolving the distillate in a mixture of ether and petroleum ether, and finally crystallizing the zingiberone out of the solution.

3. The method of preparing zingiberone comprising adding a 10% solution of caustic soda to a solution of vanillin and acetone and allowing the same to stand, then adding hydrochloric acid to the solution to obtain a precipitate, then filtering and washing the precipitate, then dissolving the precipitate in alcohol, then crystallizing the vanillalacetone out of the solution, then dissolving the vanillalacetone crystals in a solvent and reducing the solution by means of hydrogen in the presence of platinum black, filtering off the platinum black, then evaporating the filtrate to an oil, then distilling the oil, then dissolving the distillate in a solvent and finally crystallizing the zingiberone out of the solution.

4. The method of preparing zingiberone comprising adding a 10% solution of caustic soda to a solution of vanillin and acetone and allowing the same to stand, then adding hydrochloric acid to the solution to obtain a precipitate, then filtering and washing the precipitate, then dissolving the precipitate in alcohol, then crystallizing the vanillalacetone out of the solution, then dissolving the vanillalacetone crystals in ether, then reducing the solution by means of hydrogen in the presence of platinum black, then filtering off the platinum black, then evaporating the filtrate to an oil, then distilling the oil, then dissolving the distillate in a mixture of ether and petroleum ether and finally crystallizing the zingiberone out of the solution.

In testimony whereof I affix my signature in presence of two witnesses.

HIROSHI NOMURA.

Witnesses:
H. F. HAWLEY,
M. MOCHIZUKI.